United States Patent [19]

Saive et al.

[11] Patent Number: 5,210,160
[45] Date of Patent: * May 11, 1993

[54] PREPARATION OF HOMOPOLYMERS OF ETHENE AND COPOLYMERS OF ETHENE WITH HIGHER A-MONOOLEFINS USING A ZIEGLER CATALYST SYSTEM

[75] Inventors: Roland Saive, Ludwigshafen; Guido Funk, Worms; Rainer Hemmerich, Gruenstadt, all of Fed. Rep. of Germany

[73] Assignee: BASF Aktiengesellschaft, Ludwigshafen, Fed. Rep. of Germany

[*] Notice: The portion of the term of this patent subsequent to May 12, 2009 has been disclaimed.

[21] Appl. No.: 410,047

[22] Filed: Sep. 19, 1989

[30] Foreign Application Priority Data

Oct. 7, 1988 [DE] Fed. Rep. of Germany ....... 3834088

[51] Int. Cl.$^5$ .................. C08F 4/629; C08F 4/635; C08F 4/636; C08F 10/02
[52] U.S. Cl. ................................ 526/116; 526/129; 526/348.6; 502/113
[58] Field of Search ............. 526/116, 129, 128, 132, 526/133

[56] References Cited

U.S. PATENT DOCUMENTS

| | | | |
|---|---|---|---|
| 4,210,552 | 12/1987 | Bachl et al. | 526/116 |
| 4,831,090 | 5/1990 | Bachl et al. | 526/116 |
| 4,999,327 | 3/1991 | Kao et al. | 526/128 |

FOREIGN PATENT DOCUMENTS

| | | | |
|---|---|---|---|
| 1251895 | 3/1989 | Canada . | |
| 0166888 | 1/1986 | European Pat. Off. . | |
| 61-123605 | 6/1986 | Japan | 526/116 |
| 2065146 | 6/1981 | United Kingdom . | |
| 2066273 | 7/1981 | United Kingdom . | |
| 2101611 | 1/1983 | United Kingdom | 526/129 |

OTHER PUBLICATIONS

U.S. Ser. No. 07/258,762.

*Primary Examiner*—Edward J. Smith
*Attorney, Agent, or Firm*—Keil & Weinkauf

[57] ABSTRACT

Homopolymerization and copolymerization of ethene is carried out using a Ziegler catalyst system consisting of (1) a transition metal catalyst component, (2) an organoaluminum catalyst component and (3) an organohalogen catalyst component. The component (1) used is the solid-phase product (VI) which has been obtained by a method in which (1.1) first (1.1.1) an inorganic oxidic substance (I) as a carrier and (1.1.2) a solution (II) of (IIa) a certain oxahydrocarbon and (IIb) a mixture of (IIb1) a vanadium trichloride/alcohol complex and (IIb2) a titanium trihalide or titanium trihalide/alcohol complex and (IIc) a silicon or boron compound are combined with formation of a suspension (III) and the latter is evaporated to form a solid-phase intermediate (IV) and (1.2) then (1.2.1) the intermediate (IV) obtained in (1.1) and (1.2.2) a dissolved organoaluminum compound (V) are combined with formation of a suspension, the solid-phase product (VI) formed as the suspended substance being the transition metal catalyst component (1).

2 Claims, No Drawings

PREPARATION OF HOMOPOLYMERS OF ETHENE AND COPOLYMERS OF ETHENE WITH HIGHER A-MONOOLEFINS USING A ZIEGLER CATALYST SYSTEM

The present invention relates to a process for the batchwise and, in particular, continuous preparation of homopolymers of ethene and, in particular, copolymers of ethene with minor amounts of $C_3$-$C_8$-a-monoolefins, in particular $C_4$-$C_6$-a-monoolefins, by polymerization of the monomer or monomers at from 30° to 200° C., in particular from 50° to 125° C., and under from 0.1 to 200, in particular from 5 to 60, bar using a Ziegler catalyst system consisting of (1) a transition metal catalyst component and
(2) an organoaluminum catalyst component of the formula $AlR_mX_{3-m}$, where X is a radical OR, chlorine, bromine or hydrogen, preferably a radical OR or chlorine, R is a $C_1$-$C_{18}$-hydrocarbon radical, in particular $C_1$-$C_{12}$-alkyl, preferably $C_2$-$C_8$-alkyl, and m is from 1 to 3, preferably from 2 to 3, and
(3) an organohalogen catalyst component (=cocatalyst), with the provisos that the atomic ratio of transition metal from catalyst component (1) to aluminum from catalyst component (2) is from 1:0.1 to 1:500, preferably from 1:0.2 to 1:50, and the molar ratio of organoaluminum catalyst component (2) to organohalogen catalyst component (3) is from 1:0.0001 to 1:10, preferably from 1:0.01 to 1:0.8.

Polymerization processes of this type are known and in the present context, for example, the process described and proposed in U.S. patent application No. 4 710 552 or in U.S. patent Ser. No. 07/258 762 now abandoned may be regarded as typical.

Like other similar procedures, the stated procedure is based on a specially designed Ziegler catalyst system.

It is an object of the present invention to provide a catalyst system which permits the preparation of an ethylene homopolymer or of a copolymer of ethylene with a-olefins having a controllable molecular weight and molecular weight distribution and excellent morphological properties and gives an extremely high yield.

It is a further object of the present invention to ensure the technical feasibility of the polymerization using the conventional reactor technology.

Particularly important in this context was the achievement of a high yield and excellent morphology, since the prior art, typified, for example, by U.S. Pat. No. 4 710 552, was unsatisfactory in this respect.

We have found that these objects are achieved by a catalyst system which has a special transition metal catalyst component (1), which must be prepared in a certain manner and which must contain the transition metals vanadium and titanium together in a certain form.

The present invention accordingly relates to a process for the batchwise and, in particular, continuous preparation of homopolymers of ethene and, in particular, copolymers of ethene with minor amounts of $C_3$-$C_8$-a-monoolefins, in particular $C_4$-$C_6$-a-monoolefins, by polymerization of the monomer or monomers at from 30° to 200° C., in particular from 50° to 125° C., and under from 0.1 to 200, in particular from 5 to 60, bar using a Ziegler catalyst system consisting of (1) a transition metal catalyst component and
(2) an organoaluminum catalyst component of the formula $AlR_mX_{3-m}$, where X is a radical OR, chlorine, bromine or hydrogen, preferably a radical OR or chlorine, R is a $C_1$-$C_{18}$-hydrocarbon radical, in particular $C_1$-$C_{12}$-alkyl, preferably $C_2$-$C_8$-alkyl, and m is from 1 to 3, preferably from 2 to 3, and
(3) an organohalogen catalyst component (=cocatalyst), with the provisos that the atomic ratio of transition metal from catalyst component (1) to aluminum from catalyst component (2) is from 1:0.1 to 1:500, preferably from 1:0.2 to 1:50, and the molar ratio of organoaluminum catalyst component (2) to organohalogen catalyst component (3) is from 1:0.001 to 1:10, preferably from 1:0.01 to 1:0.8.

In the novel process, the transition metal catalyst component (1) used is the solid-phase product (VI) which has been obtained by a method in which (1.1) first
(1.1.1) a finely divided, porous, inorganic oxidic substance (I) which has a particle diameter of from 1 to 1,000 lm, preferably from 1 to 400 lm, a pore volume of from 0.3 to 3, preferably from 1 to 2.5, $cm^3/g$ and a specific surface area of from 100 to 1,000, preferably from 200 to 400, $m^2/g$ and is of the formula $SiO_2.aAl_2O_3$, where a is from 0 to 2, in particular from 0 to 0.5, and
(1.1.2) a solution (II) as obtained on combining (IIa) 100 parts by weight of a saturated aliphatic or partly saturated aliphatic and partly aromatic oxahydrocarbon which has 1 or 2 oxaoxygen atoms, preferably one oxaoxygen atom, and more than 3 but less than 19, preferably more than 3 but less than 11, carbon atoms, in particular a saturated aliphatic cyclic oxahydrocarbon which has one oxaoxygen atom and 4 to 6 carbon atoms, especially tetrahydrofuran, and
(IIb) from 0.01 to 50, preferably from 1 to 30, parts by weight of a mixture of
(IIb1) 100 molar parts of a vanadium trihalide/alcohol complex of the formula $VY_3.nZ$-OH, where Y is chlorine or bromine, preferably chlorine, n is from 1 to 6, preferably from 3 to 4, and Z is a monovalent saturated aliphatic or partly saturated aliphatic and partly aromatic hydrocarbon radical of not more than 10, preferably not more than 8, carbon atoms, in particular alkyl of not more than 6 carbon atoms,
(IIb2) from 0.2 to 200, preferably from 0.5 to 100, molar parts of a titanium trihalide, where halogen may be chlorine and/or bromine, preferably a titanium trichloride, or a titanium trihalide/alcohol complex of the formula $TiY_3.nZ$-OH, where Y is chlorine or bromine, preferably chlorine, n is from 1 to 6, preferably from 3 to 4, and Z is a monovalent saturated aliphatic or partly saturated aliphatic and partly aromatic hydrocarbon radical of not more than 10, preferably not more than 8, carbon atoms, in particular alkyl of not more than 4 carbon atoms, and
(IIc) from 1 to 200, preferably from 1 to 100, parts by weight of a compound of the type $BX_nY_mR_p$ or $SiX_nY_mR_q$, where X is a radical OR, Y is chlorine, bromine or hydrogen and R is a $C_1$-$C_{18}$-hydrocarbon radical, with the proviso that $n>0$ and $n+m+p=3$ or $n+m+q=4$, preferably a compound of the type $SiX_nR_q$, where X is a radical OR and R should be an aliphatic or aromatic $C_1$-$C_{18}$- hydrocarbon radical, n should be >0 and n+q should be 4, particularly preferably a compound in which n>1 and R is a hydrocarbon radical of 1 to 10 carbon atoms, are brought into contact with one another with formation of a suspension (III), with the proviso that the weight ratio of inorganic oxidic substance (I) to transition metal composition (IIb) is from 1:0.01 to 1:2, preferably from 1:0.2 to 1:1.5, the suspension (III) is evaporated to dryness at a temperature which is below 200° C., preferably below 160° C., and above the melting point of the oxahydrocarbon (IIa) used, with formation of a solid-phase intermediate (IV), and (1.2) then (1.2.1) the solid-phase intermediate (IV) obtained from stage (1.1) and (1.2.2) an aluminum compound (V) which is dissolved in an organic solvent and is of the formula $AlR_mX_{3-m}$, where X is a radical OR, chlorine, bromine or hydrogen, preferably a radical OR or chlorine, R is a $C_1$-$C_{18}$-hydrocarbon radical, in particular $C_1$-$C_{12}$-alkyl, preferably $C_2$-$C_8$-alkyl, and m is from 1 to 3, preferably 2, are brought into contact with one another with formation of a suspension, with the proviso that the weight ratio of solid-phase intermediate (IV) to aluminum compound (V) is from 1:0.05 to 1:2, preferably from 1:0.1 to 1:1, the solid-phase product (VI) formed as the suspended substance being the transition metal catalyst component (I).

Regarding the novel process, the following may be stated by way of explanation:

Provided that the defining features are taken into account, the polymerization process as such can be carried out in virtually all relevant conventional technological embodiments, for example as a suspension or dry-phase polymerization process. The stated technological embodiments, ie. the technological variants of the polymerization of olefins by the Ziegler method, are well known from the literature and in practice, so that further description is unnecessary here. All that need be stated is that, in the novel process, the components of the catalyst system can be introduced into the polymerization space in a variety of ways, for example (i) the transition metal component (1), the organoaluminum component (2) and the organohalogen component (3) all at the same place, (ii) the transition metal component (1) on the one hand and a mixture of (2) and (3) on the other hand at separate places, which may be particularly advantageous, or (iii) a mixture of the transition metal component (1) and the organohalogen component (3) on the one hand and the organoaluminum component (2) on the other hand at separate places.

The novel process, which is preferably carried out by a continuous method, is suitable for the preparation of homopolymers of ethene, but mainly for the preparation of copolymers of ethene with minor amounts of $C_3$-$C_8$-a-monoolefins, in particular $C_4$-$C_6$-a-monoolefins; the latter may be present in the form of individual substances or in the form of mixtures of two or more individual substances. a-Monoolefins which are suitable for copolymerization are in particular the straight-chain ones, such as propene, n-but-1-ene, n-pent-1-ene, n-hex-1-ene, n-hept-1-ene and n-oct-1-ene, the most valuable polymers being obtainable with n-but-1-ene and n-hex-1-ene (or mixtures of these two a-monoolefins), in particular those which contain from 0.1 to 10 molar units of the higher a-monoolefin or of the higher a-monoolefins as copolymerized units per 100 molar units of ethene.

The molecular weights of the polymers may be regulated in a relevant conventional manner, in particular using hydrogen as a regulator.

Regarding the transition metal catalyst component (1) to be used in the novel process, the following may be stated specifically:

It is prepared in two stages, which are referred to above and below as (1.1) and (1.2).

In stage (1.1), a finely divided inorganic oxidic substance (I) of the type defined above and a certain solution (II) defined above are brought into contact with one another to form a suspension (III), which is evaporated to dryness, with formation of a solid-phase intermediate (IV). In stage (1.2), the latter is brought into contact with a solution of a certain aluminum compound (V) defined above, with formation of a further suspension, the solid-phase product (VI) obtained as the suspended substance being the novel catalyst component (1).

The specific procedure is as follows:

Stage (1.1)

The inorganic oxidic substance (I), as such or in suspension in an oxahydrocarbon (advantageously an oxahydrocarbon as defined under (IIa) and having a solids content of the suspension of not less than 5% by weight), is combined with the solution (II), and the suspension (III) formed is then evaporated down.

The solution (II) itself can be prepared in the manner conventionally used for the preparation of solutions and thus has no special features.

As a final measure in stage (1.1), the suspension (III) is evaporated to dryness, the solid-phase intermediate (IV) being obtained. Provided that the temperature conditions stated above are observed, the procedure adopted here may be the same as that conventionally used for the evaporation of suspensions under mild conditions. This means that it is generally advantageous, and may be indispensible in the case of relatively high oxahydrocarbons (IIa), to carry out the evaporation under more or less greatly reduced pressure. As a rule of thumb, the pair of parameters temperature/pressure should be chosen so that the evaporation process is complete after about 1–10 hours. It is also advantageous to carry out the evaporation while constantly maintaining the homogeneity of the treated material; for example, rotary evaporators have proven useful for this purpose. Any residual amount of oxahydrocarbon, for example an amount bound by complex formation, generally has no adverse effect on the solid-phase intermediate (IV).

Stage (1.2)

A 0.1–50, preferably about 25, % strength by weight suspension of the solid-phase intermediate (IV) and a 5–80, preferably about 20, % strength by weight solution of the aluminum compound (V) are first prepared in separate batches, the suspending agent and solvent used respectively being in particular hydrocarbons, especially relatively low-boiling alkanehydrocarbons, such as hexanes, heptanes or gasolines. The suspension and the solution are then combined in a ratio such that the desired weight ratio is obtained. They are generally combined by introducing the solution into the stirred suspension, since this procedure is more practical than the converse one, which is also possible. At from −25° to 20° C., in particular from 25° to 80° C., the formation of the solid-phase product (VI), which is present as the suspended substance, is complete within from 15 to 600, in particular from 60 to 300, minutes.

This can advantageously be used as transition metal catalyst component (1), directly in the form of the resulting suspension, if necessary after washing by digestion or filtration. If desired, however, it is also possible to isolate the solid-phase product (VI) before using it as catalyst component (I); for example, the following method is suitable for effecting isolation: the product (VI) is separated from the liquid phase by filtration and is washed with a pure liquid (for example a liquid of the type which has also been used as a suspending agent or solvent), after which it is dried, for example at reduced pressure.

Regarding the composition of the transition metal catalyst component (I), the following may be stated specifically:

The inorganic oxidic substance (I) to be used in stage (1.1) is generally an aluminosilicate or, in particular, a silica; what is important is that it has the required properties. It has been found that the relevant conventional commercial carriers which conform to the stated specification are suitable.

The solvent (IIa) to be used is a saturated aliphatic or partly saturated aliphatic and partly aromatic oxahydrocarbon having one or two oxaoxygen atoms, preferably 1 oxaoxygen atom, and more than 3 but less than 19, preferably more than 3 but less than 11, carbon atoms, in particular a saturated aliphatic cyclic oxahydrocarbon which has one oxaoxygen atom and 4 to 6 carbon atoms, especially tetrahydrofuran. In addition to the last-mentioned substance, and taking into account the above-mentioned order, examples of other suitable oxahydrocarbons are ethylene glycol dimethyl ether, anisole, tetrahydropyran and dioxane. The oxahydrocarbons can be used in the form of individual compounds and as mixtures of two or more individual compounds.

The vanadium trihalide/alcohol complex (IIb1) to be used is of the formula $VY_3 \cdot nZ\text{-}OH$, where Y is chlorine or bromine, preferably chlorine, n is from 1 to 6, preferably from 3 to 4, and Z is a monovalent saturated aliphatic or partly saturated aliphatic and partly aromatic hydrocarbon radical of not more than 10, preferably not more than 8, carbon atoms, in particular alkyl of not more than 6 carbon atoms. The parent vanadium trihalide may be one which is conventionally used in Ziegler catalyst systems. Suitable alcohol components are, for example, methanol, ethanol, propan-2-ol, butan-2-ol and 2-methylbutan-2-ol, the above-mentioned order being observed. The complexes can be prepared by conventional methods, for example advantageously in situ from vanadium trichloride and propan-2-ol in tetrahydrofuran as a solvent, for example according to D. C. Bradley and H. L. Kehta, Can. J. Chem. 40 (1962), 1710/3; they too can be used in the form of individual compounds and as mixtures of two or more individual compounds.

The titanium trihalide (IIb2) to be used can also be one which is conventionally employed in Ziegler catalyst systems, for example a reaction product obtained by reduction of a titanium tetrahalide by means of hydrogen, aluminum or organoaluminum compounds. For example, trichlorides of the formula $TiCl_3$, as obtained in the reduction of titanium tetrachloride by means of hydrogen, and trichlorides of the formula $TiCl_3 \cdot 1/3 AlCl_3$, as obtained in the reduction of titanium tetrachloride by means of metallic aluminum, have proven particularly suitable. Alternatively, a titanium trihalide/alcohol complex of the type defined at the outset may be used; in other respects, the statements made in connection with the vanadium trihalide/alcohol complex (IIb1) are applicable in the relevant sense to this complex. The titanium trihalides and titanium trichloride/alcohol complexes can be used in the form of individual compounds and as mixtures of two or more individual compounds.

The silicon or boron compound to be used under (IIc) is of the formula $BX_nY_mR_p$ or $SiX_nY_mR_q$, where X is a radical OR, Y is chlorine, bromine or hydrogen and R is a $C_1$–$C_{18}$-hydrocarbon radical, with the proviso that n is $>0$ and $n+m+p=3$ or $n+m+q=4$, preferably of the formula $SiX_nR_q$, where X is a radical OR, R is an aliphatic or aromatic $C_1$–$C_{18}$-hydrocarbon radical, n should be $>0$ and $n+q$ should be 4, particularly preferably of the formula $SiX_nR_q$, where n is $>1$, $n+q=4$ and R is a hydrocarbon radical of 1 to 10 carbon atoms; for example, triisopropyl borate, tetrabutyl silicate, toluyltriethoxysilane, phenyltriethoxysilane and dimethyldiethoxysilane are suitable, the abovementioned order being observed; mixtures of such compounds are also suitable The aluminum compound (V) to be used in stage (1.2) may be, for example, a compound of the formula $Al(C_2H_5)_3$, $Al(C_2H_5)_2Cl$, $Al(C_2H_5)_2Br$, $Al(C_2H_5)_{1.5}Cl_{1.5}$, $Al(C_2H_5)_{1.5}Br_{1.5}$, $Al(C_2H_5)Cl_2$, $Al(C_2H_5)Br_2$, $Al(C_4H_9)_3$, $Al(C_4H_9)_2Cl$, $Al(C_4H_9)Cl_2$, $Al(C_2H_5)_2H$, $Al(C_4H_9)_2H$, $Al(C_3H_7)_2(OC_3H_7)$ or $Al(C_2H_5)_{1.5}(OC_2H_5)_{1.5}$ and isoprenylaluminum. It has been found that aluminum compounds of the formulae $C_2H_5AlCl_2$ and $(C_2H_5)_2AlCl$ and isoprenylaluminum are particularly suitable. The aluminum compounds (V) can be used in the form of individual compounds or as mixtures of two or more individual compounds.

Regarding the organoaluminum catalyst component (2), it may be said that the relevant conventional compounds are suitable for this purpose; examples of suitable individual compounds are those of the formulae $Al(C_2H_5)_3$, $Al(i\text{-}C_4H_9)_3$, $Al(n\text{-}C_4H_9)_3$ and $Al(C_8H_{17})_3$ and isoprenylaluminum.

Finally, a compound from the following classes may advantageously be used as organohalogen catalyst component (3):

(A) Saturated aliphatic halohydrocarbons, suitable individual compounds being those of the formulae $CCl_4$, $CHCl_3$, $CH_2Cl_2$, $CBr_4$, $CHBR_3$, $CFCl_3$, $CF_2Cl_2$ and $CF_3Cl$. Of these, $CCl_4$, $CHCl_3$, $CH_2Cl_2$ and $CF_2Cl_2$ are particularly suitable. $CFCl_3$ is outstandingly suitable.

(B) Olefinically unsaturated aliphatic halohydrocarbons, suitable individual compounds being those of the formulae $CH_2=CHCl$, $CH_2=CCl_2$, $CHCl=CCl_2$, $Cl_2C=CCl_2$, $CH_2=CH\text{---}CH_2Cl$, $CCl_2=CCl\text{---}CCl_3$, $CH_2=CHBr$ and $CH_2=CH\text{---}CH_2Br$. Of these, $CH_2=CHCl$, $CH_2=CCl_2$ and $CH_2=CHBr$ are particularly suitable. $CH_2=CH\text{---}CH_2Cl$, $CCl_2=CCl\text{---}CCl_3$ and $CH_2=CH\text{---}CH_2Br$ are outstandingly suitable.

(C) Acetylenically unsaturated aliphatic halohydrocarbons, suitable individual compounds being those of the formulae $CH\}C\text{---}CH_2Cl$, $CH\}C\text{---}CH_2Br$, $CH_3\text{---}C\}C\text{---}CH_2Cl$, $CH_3\text{---}C\}C\text{---}CH_2Br$, $C_2H_5\text{---}C\}C\text{---}CH_2Cl$ and $C_{25}\text{---}C\}C\text{---}CH_2Br$. Of these, $CH_3\text{---}C\}\text{---}CH_2Cl$ and $CH_3\text{---}C\}C\text{---}CH_2Br$ are particularly suitable. CH}C—CH₂Cl and CH}C—CH₂Br are outstandingly suitable.

(D) Aromatic halohydrocarbons, suitable individual compounds being a-chlorotoluene, a,a-dichlorotoluene, a,a,a-trichlorotoluene, diphenylchloromethane, diphenyldichloromethane, triphenylchloromethane, a-bromotoluene, a,a-dibromotoluene and a,a,a-tribromotoluene. Of these, bromotoluene is particularly suitable. a-Chlorotoluene, a,a-dichlorotoluene and a,a,a-trichlorotoluene are outstandingly suitable.

(E) Saturated aliphatic halogenated ketones, carbonyl chlorides and carboxylic esters, suitable individual compounds being hexachloroacetone, monochloroacetyl chloride, dichloroacetyl chloride, trichloroacetyl chloride, monobromoacetyl bromide, methyl monochloroacetate, methyl dichloroacetate and methyl trichloroacetate. Of these, dichloroacetyl chloride, trichloroacetyl chloride, methyl trichloroacetate and in particular hexachloroacetone, monochloroacetyl chloride and methyl monochloroacetate are preferred.

(F) Olefinically unsaturated aliphatic halogenated ketones, carbonyl chlorides and carboxylic esters, suitable individual compounds being chloromethyl vinyl ketone, trichloromethyl vinyl ketone, 1-chloroacryloyl chloride, methyl 2,3,4,4-tetrachlorobut-2-enoate, ethyl 2,3,4,4-tetrachlorobut-2-enoate, n-butyl 2,3,4,4-tetrachlorobut-2-enoate, methyl perchlorocrotonate and ethyl perchlorocrotonate. Of these, chloromethyl vinyl ketone, trichloromethyl vinyl ketone, methyl perchlorocrotonate and n-butyl 2,3,4,4-tetrachlorobut-2-enoate are noteworthy.

(G) Aromatic halogenated carbonal chlorides and carboxylic esters, suitable individual compounds being α-chlorophenylacetyl chloride, methyl α-chlorophenyl acetate, ethyl α-chlorophenyl acetate, methyl α,α-dichlorophenyl acetate and ethyl α,α-dichlorophenyl acetate. Of these, α-chlorophenylacetyl chloride, methyl α-chlorophenyl acetate and methyl α,α-dichlorophenylacetate are noteworthy.

It has been found that, of the stated classes of compounds, compounds of classes (A), (B), (C) and (D) are most suitable for the purpose according to the invention, followed by (E) and finally (F) and (G). The relevant compounds can be used in the form of individual compounds or as mixtures of two or more individual compounds.

EXAMPLE

Preparation of the transition metal catalyst component (1):

Stage (1.1)

(1.1.1) 16 parts by weight of silica (SiO₂, particle diameter 20–45 μm, pore volume 1.7 cm³/g, specific surface area 320 m²/g) and (1.1.2) a solution of 100 parts by weight of tetrahydrofuran and 19 parts by weight of a transition metal composition consisting of 100 molar parts of a vanadium trihalide/alcohol complex of the formula VCl₃.4ZOH, where Z is isopropyl, and 5 molar parts of a titanium trihalide/alcohol complex of the formula TiCl₃.1/3AlCl₃.4C₃H₇OH and 14 parts by weight of Si(OC₄H₉)₄ were used as starting materials. These two components were combined, and the resulting suspension was stirred for a short time. Thereafter, the solid-phase intermediate (IV) formed was isolated by expelling the volatile constituents in a rotary evaporator, which had been brought to an operating pressure of 10 mbar and an operating temperature of 70° C.

Stage (1.2)

20 parts by weight of the solid-phase intermediate (IV) obtained in stage (1.1) were suspended in 103 parts by weight of n-heptane, after which a solution of 7.2 parts by weight of diethylaluminum chloride in 17 parts by weight of n-heptane was added to the suspension and the resulting suspension was stirred for a short time at 65° C. It was then filtered, and the residue was washed three times with n-heptane and dried under reduced pressure. The solid-phase product (VI) obtained is the catalyst component (1).

Polymerization

A 10 l autoclave was charged with 5 l of isobutane, 0.1 l of but-1-ene, 8 l of H₂ gas, 0.111 g of catalyst component (1), 5 millimoles of triisobutylaluminum as catalyst component (2) and 2 millimoles of trichlorofluoromethane as organohalogen catalyst component (3).

Polymerization was then carried out for 90 minutes with stirring and using the following parameters, kept constant in each case by regulation: ethene partial pressure 16.5 bar, temperature 80° C.; after this time, the polymerization was stopped by letting down the pressure.

Further data on the copolymer obtained are shown in the Table.

COMPARATIVE EXPERIMENT

Preparation of transition metal catalyst component (1)

Stage (1.1)

(1.1.1) 16 parts by weight of silica (SiO₂, particle diameter 20–45 lm, pore volume 1.7 cm³/g, specific surface area 320 m²/g) and (1.1.2) a solution of 100 parts by weight of tetrahydrofuran and 19 parts by weight of a transition metal composition consisting of 100 molar parts of a vanadium trihalide/alcohol complex of the formula VCl₃.4ZOH, where Z is isopropyl, and 5 molar parts of a titanium trihalide/alcohol complex of the formula TiCl₃.1/3AlCl₃.4C₃H₇OH were used as starting materials. These two components were combined, and the resulting suspension was stirred for a short time. Thereafter, the solid-phase intermediate (IV) formed was isolated by expelling the volatile constituents in a rotary evaporator, which had been brought to an operating pressure of 10 mbar and an operating temperature of 70° C.

Stage (1.2)

20 parts by weight of the solid-phase intermediate (IV) obtained in stage (1.1) were suspended in 103 parts by weight of n-heptane, after which a solution of 7.2 parts by weight of diethylaluminum chloride in 17 parts by weight of n-heptane was added to the suspension and the resulting suspension was stirred for a short time at 65° C. It was then filtered, and the residue was washed three times with n-heptane and dried under reduced pressure. According to analysis, the solid-phase product (VI) obtained is the catalyst component (1).

Polymerization

The polymerization was carried out as in Example 1, with the sole exception that, instead of the novel transition metal catalyst component (1), 0.179 g of the transition metal catalyst component (1) described above was used.

Further data on the copolymer obtained are shown in the Table.

TABLE

| | Yield | | HLMI[1] | $[\eta]^2$ | Density[3] | Bulk density | Sieve analysis[4] [% by wt.] [mm] | | | |
|---|---|---|---|---|---|---|---|---|---|---|
| | [g/g of cat. | | | | | | | | | |
| | [g] | comp. (1)] | [g/10 min] | [dl/g] | [g/cm$^3$] | [g/l] | <0.5 | 0.5–1.0 | 1.0–2.0 | >2.0 |
| Example | 1370 | 12340 | 12 | 3.42 | 0.946 | 405 | 0.3 | 50.3 | 49.2 | 0.2 |
| Comp. Exp. | 1230 | 6870 | 16 | 3.30 | 0.948 | 414 | 1.3 | 79.3 | 17.8 | 1.6 |

[1] Determined according to DIN 53,735, 190° C., 21.6 kp load
[2] Determined according to DIN 53,728
[3] According to DIN 53,479
[4] According to DIN 53,477

The Example shows that, compared with the prior art represented by DE-A-34 17 238, the productivity of the catalyst system increases very sharply.

Furthermore, a more uniform polymer particle size is obtained, as is evident both from the a more reduced amount of fines <0.5 nm and from the reduced amount of coarse particles >2 mm.

The advantageous combination of high molecular weight, measured by the solution viscosity $[\eta]$, and good flow, measured by the HLMI, is retained without restriction.

We claim:

1. A process for the preparation of homopolymers of ethene and copolymers of ethene with minor amounts of $C_3$–$C_8$-a-monoolefins by polymerization of the monomer or monomers at from 30° to 200° C. and under pressure from 0.1 to 200 bar using a Ziegler catalyst system consisting of
   (1) a transition metal catalyst component and
   (2) an organoaluminum catalyst component of the formula $AlR_mX_{3-m}$, where X is a radical OR, chlorine, bromine or hydrogen, R is a $C_1$–$C_{18}$-hydrocarbon radical and m is from 1 to 3, and
   (3) an organohalogen catalyst component with the provisos that the atomic ratio of transition metal from catalyst component (1) to aluminum from catalyst component (2) is from 1:0.1 to 1:500, and the molar ratio of organoaluminum catalyst component (2) to organohalogen catalyst component (3) is from 1:0.0001 to 1:10,
   wherein the transition metal catalyst component (1) used is the solid-phase product (VI) which has been obtained by a method in which
   (1.1) first
   (1.1.1) a finely divided, porous, inorganic oxidic substance (I) which has a particle diameter of from 1 to 1,000 μm, a pore volume of from 0.3 to 3 cm$^3$/g and a specific surface area of from 100 to 1,000 m$^2$/g and is of the formula $SiO_2.aAl_2O_3$, where a is from 0 to 2, and
   (1.1.2) a solution (II) as obtained on combining (IIa) 100 parts by weight of a saturated aliphatic or partly saturated aliphatic and partly aromatic oxahydrocarbon which has 1 or 2 oxaoxygen atoms and more than 3 but less than 19 carbon atoms and
   (IIb) from 0.01 to 50 parts by weight of a mixture of
   (IIb1) 100 molar parts of a vanadium trihalide/alcohol complex of the formula $VY_3.nZ$-OH, where Y is chlorine or bromine, n is from 1 to 6 and Z is a monovalent saturated aliphatic or partly saturated aliphatic and partly aromatic hydrocarbon radical of not more than 10 carbon atoms,
   (IIb2) from 0.2 to 200 molar parts of a titanium trihalide, where halogen may be chlorine and/or bromine, or a titanium trihalide complex of the formula $TiY_3.nZ$-OH, where Y is chlorine or bromine, n is from 1 to 6 and Z is a monovalent saturated aliphatic or partly saturated aliphatic and partly aromatic hydrocarbon radical of not more than 10 carbon atoms, and
   (IIc) from 1 to 200 parts by weight of a compound of the type $BX_nY_mR_p$ or $SiX_nY_mR_q$, where X is a radical OR, Y is chlorine, bromine or hydrogen and R is a $C_1$–$C_{18}$-hydrocarbon radical, with the proviso that n>0 and n+m+p=3 or n+m+q=4, are brought into contact with one another with formation of a suspension (III), with the proviso that the weight ratio of inorganic oxidic substance (I) to transition metal composition (IIb) is from 1:0.01 to 1:2, the suspension (III) evaporate to dryness at a temperature which is below 200° C. and above the melting point of the oxahydrocarbon (IIa) used, with formation of a solid-phase intermediate (IV), and
   (1.2) then
   (1.2.1) the solid-phase intermediate (IV) obtained from stage (1.1) and
   (1.2.2) an aluminum compound (V) which is dissolved in an organic solvent and is of the formula $AlR_mX_{3-m}$, where X is a radical OR, chlorine, bromine or hydrogen, R is a $C_1$–$C_{18}$-hydrocarbon radical and m is from 1 to 3, are brought into contact with one another with formation of a suspension, with the proviso that the weight ratio of solid-phase intermediate (IV) to aluminum compound (V) is from 1:0.05 to 1:2, the solid-phase product (VI) formed as the suspended substance being the transition metal catalyst component (1).

2. A process as defined in claim 1, wherein the compound used for (IIc) is a compound of the type $SiX_nR_q$, where X is a radical OR, R is an aliphatic or aromatic $C_1$–$C_{18}$-hydrocarbon radical, n is>0 and n+q equals 4.

* * * * *

UNITED STATES PATENT AND TRADEMARK OFFICE
CERTIFICATE OF CORRECTION

PATENT NO. : 5,210,160  
DATED : May 11, 1993  
INVENTOR(S) : SAIVE et al.

Page 1 of 3

It is certified that error appears in the above-identified patent and that said Letters Patent is hereby corrected as shown below:

On the title page, Item [54] and Column 1, line 3

IN THE TITLE

"A-MONOOLEFINS" should read --α-MONOOLEFINS--.

Column 1, line 4, "A-MONOOLEFINS" should read --α-MONOOLEFINS--.

lines 10-11, "$C_3$-$C_8$-a-monoolefins, in particular $C_4$-$C_6$-a-monoolefins" should read --$C_3$-$C_8$-α-monoolefins, in particular $C_4$-$C_6$-α-monoolefins--.

line 43, "a-olefins" should read --α-olefins--.

lines 63-64, "$C_3$-$C_8$-a-monoolefins, in particular $C_4$-$C_6$-a-monoolefins" should read --$C_3$-$C_8$-α-monoolefins, in particular $C_4$-$C_6$-α-monoolefins--.

Column 2, line 22, "1,000 lm, preferably from 1 to 400 lm" should read "1,000 μm, preferably from 1 to 400 μm--.

Column 3, lines 58-59, "$C_3$-$C_8$-a-monoolefins, in particular $C_4$-$C_6$-a-monoolefins" should read --$C_3$-$C_8$-α-monoolefins, in particular $C_4$-$C_6$-α-monoolefins--.

line 62, "a-Monoolefins" should read --α-Monoolefins--.

line 67, "a-monoolefins)," should read --α-monoolefins),--.

Column 4, line 1, "a-monoolefin or of the higher a-

UNITED STATES PATENT AND TRADEMARK OFFICE
CERTIFICATE OF CORRECTION

PATENT NO. : 5,210,160

DATED : May 11, 1993

INVENTOR(S) : SAIVE et al.

It is certified that error appears in the above-indentified patent and that said Letters Patent is hereby corrected as shown below:

monoolefins" should read --α-monoolefin or of the higher α-monoolefins--.

Column 7, lines 3-11, "(D) Aromatic halohydrocarbons, suitable individual compounds being a-chlorotoluene, a,a-dichlorotoluene, a,a,a-trichlorotoluene, diphenylchloromethane, diphenyldichloromethane, triphenylchloromethane, a-bromotoluene, a,a-dibromotoluene and a,a,a-tribromotoluene. Of these, bromotoluene is particularly suitable. a-Chlorotoluene, a,a-dichlorotoluene and a,a,a-trichlorotoluene are outstandingly suitable." should read --(D) Aromatic halohydrocarbons, suitable individual compounds being α-chlorotoluene, α,α-dichlorotoluene, α,α,α-trichlorotoluene, diphenylchloromethane, diphenyldichloromethane, triphenylchloromethane, α-bromotoluene, α,α-dibromotoluene and α,α,α-tribromotoluene. Of these, bromotoluene is particularly suitable. α-Chlorotoluene, α,α-dichlorotoluene and α,α,α-trichlorotoluene are outstandingly suitable.--

UNITED STATES PATENT AND TRADEMARK OFFICE
CERTIFICATE OF CORRECTION

PATENT NO. : 5,210,160
DATED : May 11, 1993
INVENTOR(S) : SAIVE, et al

It is certified that error appears in the above-indentified patent and that said Letters Patent is hereby corrected as shown below:

Column 8, line 38, "20-45 lm," should read --20-45 $\mu$m,--.

IN THE CLAIMS

Claim 1, column 9, line 24, "$C_3$-$C_8$-a-monoolefins" should read --$C_3$-$C_8$-a-monoolefins--.

line 48, "$SiO_2 \cdot aAl_2O_3$, where a is" should read --$SiO_2 \cdot \alpha Al_2O_3$, where $\alpha$ is--.

column 10, line 54, "(1)" should read --(I)--.

Signed and Sealed this

Eighth Day of February, 1994

BRUCE LEHMAN

Attest:

Attesting Officer     Commissioner of Patents and Trademarks